United States Patent [19]

Bühler et al.

[11] Patent Number: 4,552,953

[45] Date of Patent: Nov. 12, 1985

[54] WATER-INSOLUBLE MONOAZO DYESTUFFS, THEIR PREPARATION AND THEIR USE

[75] Inventors: Ulrich Bühler, Schöneck; Klaus Kühlein, Kelkheim; Horst Tappe, Dietzenbach; Maria Kallay, Königstein; Uwe Kosubek, Büttelborn; Rudolf Löwenfeld, Dreieich, all of Fed. Rep. of Germany

[73] Assignee: Cassella Aktiengesellschaft, Frankfurt am Main, Fed. Rep. of Germany

[21] Appl. No.: 450,191

[22] Filed: Dec. 16, 1982

Related U.S. Application Data

[63] Continuation of Ser. No. 308,262, Oct. 5, 1981, abandoned.

[30] Foreign Application Priority Data

Dec. 24, 1980 [DE] Fed. Rep. of Germany ....... 3049180

[51] Int. Cl.⁴ .......................................... C07C 107/108
[52] U.S. Cl. ..................................................... 534/886
[58] Field of Search .......................................... 260/198

[56] References Cited

U.S. PATENT DOCUMENTS 2,283,326  5/1942  Felix et al. ..................... 534/886 X
3,673,170  7/1972  Gnad ................................ 260/198

FOREIGN PATENT DOCUMENTS 1089094  9/1960  Fed. Rep. of Germany ...... 534/886
2013809  4/1970  France ................................ 534/886

Primary Examiner—Paul F. Shaver
Attorney, Agent, or Firm—Connolly and Hutz

[57] ABSTRACT

Monoazo dyestuffs, free of carboxylic acid moieties or sulphonic acid moieties, of the formula

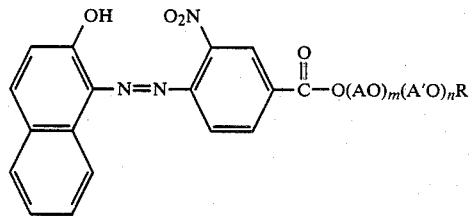

wherein
A and A' independently of one another are linear or branched alkylene having 2 to 6 carbon atoms;
R is hydrogen, alkyl having 1 to 4 carbon atoms, cycloalkyl having 5 or 6 carbon atoms, alkenyl having 3 to 5 carbon atoms, phenyl, benzyl, phenethyl, alkylcarbonyl having 1 to 4 atoms or benzoyl;
m is a number from 1 to 5 and n is a number from 0 to 1.

6 Claims, No Drawings

WATER-INSOLUBLE MONOAZO DYESTUFFS, THEIR PREPARATION AND THEIR USE

This is a continuation of application Ser. No. 308,262 filed Oct. 5, 1981, now abandoned.

The present invention relates to azo dyestuffs of the formula I

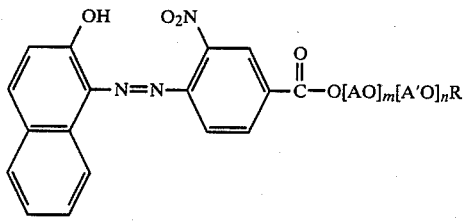

in which A and A' independently of one another denote linear or branched alkylene radicals having 2 to 6 C atoms, R denotes hydrogen, alkyl having 1 to 4 C atoms, cycloalkyl having 5 or 6 C atoms, alkenyl having 3 to 5 C atoms, phenyl, substituted phenyl, benzyl, phenethyl, alkylcarbonyl having 1 to 4 C atoms or benzoyl, and m can assume the values 1 to 5 and n the values 0 to 1, their preparation by diazotising amines of the formula II

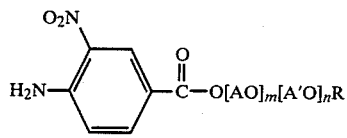

and coupling the diazotisation product with β-naphthol, and their use in dyeing and printing of hydrophobic fibre materials.

Dyestuffs based on β-naphthol with 4-amino-3-nitrobenzoic acid esters as the diazo component are already known. Thus, German Offenlegungsschrift No. 1,089,094 describes dyestuffs which contain, in the diazo component, an ester group, the alkyl radicals of which have at least 8 C atoms, which dyestuffs can be readily used for the dyeing of, for example, fats and waxes. However, these dyestuffs are less well suited to the dyeing of polyester materials.

Japanese patent specification No. 53/38,780 describes dyestuffs which contain, in the diazo component, ester groups, the alkyl radicals of which have 1 to 4 C atoms. They dye polyester in brilliant orange shades, but exhibit deficiencies with respect to the fastness properties of the dyeing and in particular with respect to application.

It has now been found, surprisingly, that these deficiencies can be overcome, if, as is the case with the dyestuffs according to the invention, the alkyl radicals of the ester groups are interrupted by oxygen atoms.

Thus, for example, the dyestuff according to the invention of the formula

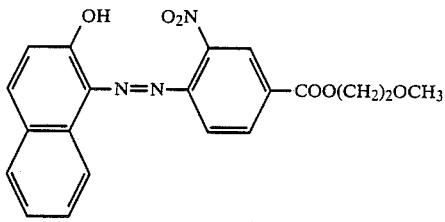

is, surprisingly, very considerably superior to the dyestuff of the formula

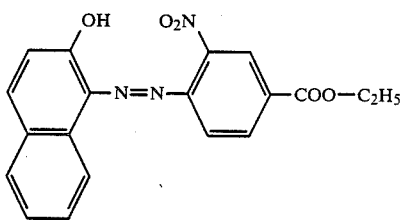

claimed in Japanese patent specification No. 53/38,780, with respect to the exhaustion behaviour, the build-up capacity and the colour yield.

This superiority manifests itself in the dyeing and printing of all industrially important hydrophobic fibre materials, in particular, polyester, triacetate and polyamide materials, and according to all current dyeing and printing methods, in particular dyeing with carriers or the high temperature dyeing process at 120° C., which is specially important for polyester.

The dyestuff according to the invention, in contrast to the known dyestuff, is therefore excellently suitable for the production of intense brilliant dyeings and prints on the fibre materials mentioned.

Linear or branched alkyl radicals which can represent A or A' are, for example, the ethylene radical, the 1,2-propylene radical, the 1,3-propylene radical, the 2,3-propylene radical, the 1,2-butylene radical, the 1,3-butylene radical, the 1,4-butylene radical, the 2,3-butylene radical, the 2,4-butylene radical, the 3,4-butylene radical, the 2,2-dimethyl-1,3-propylene radical, the 2-ethyl-1,3-propylene radical or the 1,6-hexylene radical.

Alkyl radicals having 1 to 4 C atoms which can represent R are methyl, ethyl, n-propyl, isopropyl, n-butyl, sec.-butyl, isobutyl and tert.-butyl.

Cycloalkyl radicals having 5 to 6 C atoms which can represent R are cyclopentyl and cyclohexyl.

Alkenyl radicals having 3 to 5 C atoms which can represent R are allyl, methallyl and crotyl. Optionally substituted phenyl radicals which can represent R are o-, m- or p-methylphenyl, o-, m- or p-chlorophenyl, p-methoxyphenyl and p-ethoxyphenyl.

Alkylcarbonyl radicals having 1 to 4 C atoms which can represent R are formyl, acetyl, propionyl, n-butyryl and isobutyryl.

Preferred radicals which can be represented by A or A' are 1,2-propylene, 2,3-propylene, 1,2-butylene, 3,4-butylene, 1,4-butylene and 1,6-hexylene.

The radicals A or A' particularly preferably represent ethylene. Preferred radicals which can be represented by R are alkyl having 1 to 4 C atoms, allyl, phenyl, benzyl, phenethyl and acetyl.

Specially preferred dyestuffs are those in which the radical R represents hydrogen, methyl, ethyl or n-butyl.

A preferred value for n is 0.

Particularly preferred dyestuffs of the formula I are especially also those which contain combinations of preferred characteristics, such as, for example, those in which n is zero and at the same time A denotes ethylene.

The amines of the formula II can be prepared according to methods which are in themselves known, by esterifying 3-nitro-4-aminobenzoic acid, as described, for example, in Liebigs Ann. Chem. 371, 168 (1909). They can also be prepared by transesterifying a 3-nitro-4-aminobenzoic acid ester, which is derived from a low-boiling alcohol, with an alcohol of the formula

HO[AO]$_m$[A'O]$_n$R

The transesterification can be carried out as described, for example, in Weygand-Hilgetag "Organisch-chemische Experimentierkunst" ("Organo-chemical experimental techniques"), Verlag J. A. Barth, Leipzig (1970), page 385, and literature cited there.

The preparation of the dyestuffs according to the invention, of the formula I, is carried out by diazotising an amine of the general formula II and coupling the diazotisation product with β-naphthol. The diazotisation of the amine of the formula II is carried out in a manner which is in itself known, by the action of nitrous acid or of compounds that split off nitrous acid. For example, the amines can be suspended or dissolved in sulphuric acid, hydrochloric acid or in lower aliphatic carboxylic acids, which, if appropriate, can be diluted with water, such as, for example, formic acid, acetic acid or propionic acid, and be diazotised at 0° to 50° C. by the addition of nitrosylsulphuric acid or sodium nitrite.

The coupling is customarily carried out in water to which has been added a base which provides for a sufficient concentration of naphtholate anions. Bases which, as is known, are used for this purpose are, for example, alkali metal hydroxides or alkali metal salts of weak acids, such as, for example, sodium hydroxide or potassium hydroxide, sodium carbonate or potassium carbonate or sodium bicarbonate. In addition, buffer substances are appropriately added, which trap the acid excess of the diazonium solution and the acid being released during the coupling. Such buffers are, as is known, likewise preferably alkali metal salts of weak acids, such as, for example, sodium acetate or sodium hydrogen phosphate.

The coupling can also take place in a lower aliphatic carboxylic acid, such as, for example, acetic acid, which has appropriately been diluted with water, or in a mixture of water and a sparingly water-soluble alcohol such as n-butanol or isobutanol. Appropriately, the system is also buffered by bases, such as sodium acetate or sodium hydrogen phosphate. The coupling temperature is as a rule between 0° and 30° C.

The dyestuffs according to the invention are particularly suitable for the dyeing and printing of hydrophobic fibre materials, such as, for example, polyamide, cellulose 2½-acetate or cellulose triacetate, and in particular polyester materials, such as, for example, polyethylene glycol terephthalate.

On these materials they yield, according to the customary dyeing and printing methods, intense orange dyes and prints having very good fastness properties, in particular very good fastness to light and thermofixing.

The dyeing of the fibres mentioned, which can be present on their own or in a blend with other fibre types, such as, for example, cotton, regenerated cellulose fibres or wool, using the dyestuffs according to the invention is carried out in a manner which is in itself known, appropriately from an aqueous suspension in the presence of carriers at between about 80° and 110° C., in the absence of carriers at between about 110° and 140° C., or according to the so-called thermofixing method at about 180° to 230° C. Printing of the materials mentioned can be carried out by steaming the goods, printed with the new material, at temperatures of between about 80° and 110° C. in the presence of a carrier or at about 110° to 180° C. in the absence of a carrier, or treating them according to the so-called thermofixing method at about 180° to 230° C.

If it is intended to dye or print textile materials which contain natural fibres, in particular the above-mentioned ones, in addition to the hydrophobic synthetic fibres mentioned, the dyestuffs according to the invention can be used together with other dyestuff classes, such as, for example, vat dyes, direct dyes or reactive dyes.

In these cases it is therefore possible also to apply mixtures of the dyestuffs according to the invention with the other dyestuff classes and then to fix the dyestuffs, in a manner which is in itself known, at the same time or successively.

The dyestuffs according to the invention are also suitable for dyeing the above-mentioned hydrophobic materials from organic solvents, and for spin-dyeing.

When applied by one of the above-mentioned methods, the dyestuffs according to the invention, of the formula I, are, surprisingly, considerably superior to the previously known comparable dyestuffs with respect to exhaustion behaviour, in particular on dyeing with carriers at 106°, on dyeing at 120° C. and in respect of fastness to the prolonged boiling test.

Using a small amount of dyestuff, they yield intense dyeings of high brilliance and have an excellent build-up capacity. Furthermore, they exhibit a particularly favourable advantageous behaviour during finishing.

The following exemplary embodiments illustrate the preparation of the dyestuffs according to the invention and the possibilities for their use.

EXAMPLE 1

48.0 g of 4-amino-3-nitrobenzoic acid 2-methoxyethylester are diazotised in glacial acetic acid at 15° C. by the dropwise addition of 66.0 g of nitrosylsulphuric acid (40.5% strength). The diazo solution is allowed to run into a solution of 31.6 g of β-naphthol in 240 ml of 1N sodium hydroxide solution and 144 g of anhydrous sodium acetate in 2,000 g of ice/water at 0° to 5° C. After the coupling is complete, the dyestuff obtained is filtered off under suction, washed with water until neutral and free of salt, and dried under reduced pressure. In this way 76.7 g of the dyestuff of the formula

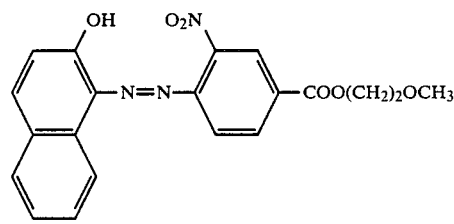

which melts at 158° to 162° C., are obtained.

EXAMPLE 2

0.5 g of the highly disperse dyestuff of Example 1 is added, whilst stirring, to 2,000 g of water. The pH of the dispersion is then adjusted to a value of 5 to 6 using acetic acid, and 4.0 g of ammonium sulphate and 2.0 g of a commercial dispersing agent based on a naphthalene-sulphonic acidformaldehydecondensate are added. 100 g of a polyester fabric based on polyethylene glycol terephthalate are added to the dyeing liquor thus obtained, and the dyeing is carried out in a dyeing autoclave for 1 hour at 120° C. After subsequent rinsing, reduction clearing using a 0.2% strength alkaline sodium dithionite solution for 15 minutes at 70° to 80° C., rinsing and drying, an intense brilliant orange dyeing having very good colouristic properties is obtained.

EXAMPLE 3

20.0 g of the dyestuff of Example 1, in a finely divided form are incorporated into a printing paste, which contains 45.0 g of carob bean flour, 6.0 g of sodium 3-nitrobenzenesulphonate and 3.0 g of citric acid per 1,000 g. Using this printing paste, an intense brilliant orange print having very good colouristic properties is obtained on a polyester fabric after printing, drying and fixing in a thermofixing frame for 40 seconds at 195° C., rinsing and finishing, as described in Example 2

Analogously to Example 1, dyestuffs according to the invention, of the formula I, in which the radical $[AO]_m$-$[A'O]_nR$ has the specific meanings given in the list below, can be prepared.

| $-[AO]_m-[A'O]_n-R$ |
| --- |
| $-(CH_2)_2OC_2H_5$ |
| $-(CH_2)_2O-C_3H_7(n)$ |
| $-(CH_2)_2O-C_3H_7(n)$ |
| $-(CH_2)_2O-C_4H_9(n)$ |
| $-(CH_2)_2O-C_4H_9(n)$ |
| $-(CH_2)_2O-C_4H_9(tert.)$ |
| $-(CH_2)_2OCH_2CH=CH_2$ |
| $-(CH_2)_2OC_6H_{11}$ |
| $-(CH_2)_2OC_6H_5$ |
| $-(CH_2)_2OCH_2C_6H_5$ |
| $-(CH_2)_2OCOCH_3$ |
| $-(CH_2)_2OCOC_6H_5$ |
| $-(CH_2)_2OH$ |
| $-(CH_2)_2O(CH_2)_2C_6H_5$ |
| $-(CH_2)_2O(CH_2)_2OCH_3$ |
| $-(CH_2)_2O(CH_2)_2OC_2H_5$ |
| $-(CH_2)_2O(CH_2)_2O-C_4H_9(n)$ |
| $-(CH_2)_2O(CH_2)_2OCH_2CH=CHCH_3$ |
| $-(CH_2)_2O(CH_2)_2OH$ |
| $-(CH_2)_2O(CH_2)_2OCOCH_3$ |
| $-(CH_2)_2O(CH_2)_2O(CH_2)_2OCH_3$ |
| $-(CH_2)_2O(CH_2)_2O(CH_2)_2OC_2H_5$ |
| $-(CH_2)_2O(CH_2)_2O(CH_2)_2O-C_4H_9(n)$ |
| $-(CH_2)_2O(CH_2)_2O(CH_2)_2O(CH_2)_2OC_2H_5$ |
| $-(CH_2)_2O(CH_2)O(CH_2)_2O(CH_2)_2O(CH_2)_2O-C_4H_9(n)$ |
| $-(CH_2)_2O(CH_2)_2O(CH_2)_2O(CH_2)_2OH$ |
| $-(CH_2)_2O(CH_2)_2O(CH_2)_2O(CH_2)_2OCOC_2H_5$ |
| $-(CH_2)_2O(CH_2)_2O(CH_2)_2O(CH_2)O(CH_2)_2OC_2H_5$ |
| $-(CH_2)_2O(CH_2)O(CH_2)_2O(CH_2)_2O(CH_2)OH$ |
| $-(CH_2)_2O(CH_2)_2O(CH_2)_2O(CH_2)_2O(CH_2)_2O-C_4H_9(n)$ |

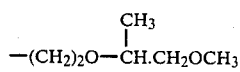
$-(CH_2)_2O-CH(CH_3)CH_2OCH_3$

$-(CH_2)_2OCH_2CH(CH_3)-OCH_3$

| -continued |
| --- |
| $-[AO]_m-[A'O]_n-R$ |
| $-(CH_2)_2O-CH_2CH(CH_3).O-C_4H_9(n)$ |
| $-(CH_2)_2OCH_2CH_2CH(CH_3)-OCH_3$ |
| $-(CH_2)_2O(CH_2)_2OCH(CH_3)CH_2OCH_3$ |
| $-(CH_2)_2O(CH_2)_4OH$ |
| $-(CH_2)_2OCH(CH_3)-CH(CH_3)-OH$ |
| $-(CH_2)_2O(CH_2)_4OCH_3$ |
| $-(CH_2)_2O(CH_2)_2OCH(CH_3)CH_2OCH_3$ |
| $-(CH_2)_2O(CH_2)_3OH$ |
| $-(CH_2)_2O(CH_2)_3OCOCH_3$ |
| $-CH(CH_3)CH_2OCH_3$ |
| $-CH_2CH(CH_3)OCH_3$ |
| $-CH_2CH_2CH(CH_3)OCH_3$ |
| $-(CH_2)_3OH$ |
| $-(CH_2)_3OCH_2C_6H_5$ |
| $-(CH_2)_4OCOC_4H_9$ |
| $-(CH_2)_4OCOC_3H_7$ |

What is claimed is:

1. Monoazo dyestuffs, free of carboxylic acid moieties or sulphonic acid moieties, of the formula

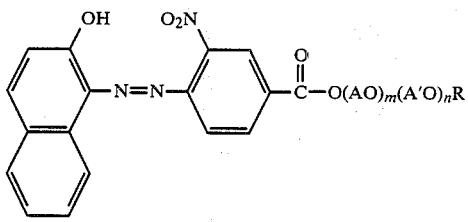

wherein A and A' independently of one another are linear or branched alkylene having 2 to 6 carbon atoms; R is hydrogen, alkyl having 1 to 4 carbon atoms, cycloalkyl having 5 to 6 carbon atoms, alkenyl having 3 to 5 carbon atoms, phenyl, benzyl, phenethyl, alkylcarbonyl having 1 to 4 carbon atoms or benzoyl;

m is a number from 1 to 5 and n is a number from 0 to 1.

2. Dyestuffs according to claim 1 wherein A and A' are each ethylene.

3. Dyestuffs according to claim 1 wherein n is zero.

4. Dyestuffs according to claim 3 wherein n is zero and A is ethylene.

5. Dyestuffs according to any one of claims 1 to 4 wherein R is alkyl having 1 to 4 carbon atoms, allyl, phenyl, benzyl, phenethyl or acetyl.
6. The process for preparation of monoazo dyestuffs according to claim 1 comprising diazotizing an amine of the formula
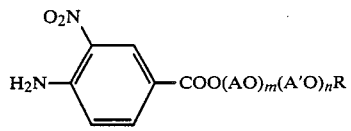
to produce a diazotized product and coupling the diazotized product with β-napthol.
* * * * *